US012596935B2

(12) United States Patent
Wells et al.

(10) Patent No.: US 12,596,935 B2
(45) Date of Patent: Apr. 7, 2026

(54) SYSTEM AND METHOD FOR PROCESSING AND TRANSFORMING INCOMING RESOURCES TO AUTO-CODE REPORTING PARAMETERS

(71) Applicant: EMS Management and Consultants, Inc., Winston-Salem, NC (US)

(72) Inventors: Natalie Wells, Winston-Salem, NC (US); Jason Moffett, Winston-Salem, NC (US); Kylie Harper, Winston-Salem, NC (US); Eric McClain, Winston-Salem, NC (US); Rhianna Bright, Winston-Salem, NC (US); Angie Schurter, Winston-Salem, NC (US); Mary Beth Harb, Winston-Salem, NC (US); Matthew Tabin, Winston-Salem, NC (US); Antonio Ramirez Cobos, Winston-Salem, NC (US); Vladimir Prorok, Winston-Salem, NC (US); Aleksandar Panic, Winston-Salem, NC (US)

(73) Assignee: EMS Management and Consultants, Inc., Winston-Salem, NC (US)

( * ) Notice: Subject to any disclaimer, the term of this patent is extended or adjusted under 35 U.S.C. 154(b) by 826 days.

(21) Appl. No.: 17/691,831

(22) Filed: Mar. 10, 2022

(65) Prior Publication Data

US 2023/0103508 A1      Apr. 6, 2023

Related U.S. Application Data

(60) Provisional application No. 63/251,453, filed on Oct. 1, 2021.

(51) Int. Cl.
*G06N 5/025* (2023.01)
*G06F 16/25* (2019.01)

(52) U.S. Cl.
CPC ........... *G06N 5/025* (2013.01); *G06F 16/258* (2019.01)

(58) Field of Classification Search
CPC ........ G06N 5/025; G06N 5/02; G06F 16/258; G06F 8/30; G06F 8/75; G16H 10/60; G16H 70/20; G16H 15/00; G06Q 10/10
(Continued)

(56) References Cited

U.S. PATENT DOCUMENTS

2002/0091818 A1* 7/2002 Cascio .............. G06F 16/24568
709/224
2007/0250351 A1* 10/2007 Szlam ................... G06Q 10/06
715/234
(Continued)

*Primary Examiner* — Md I Uddin
(74) *Attorney, Agent, or Firm* — Bradley Arant Boult Cummings LLP; Henry B. Ward, III

(57) ABSTRACT

Embodiments of the present invention provide a system for processing and transforming incoming resources to auto-code reporting parameters. In particular, the system may be configured to receive one or more resources from one or more data sources, pre-process the one or more resources to extract one or more input parameters, process the one or more input parameters, via a decisioning engine, auto-code one or more reporting parameters based on processing the one or more input parameters, via the decisioning engine, check for predetermined conditions based on one or more predetermined rules, and prepare an output file comprising the auto-coded one or more reporting parameters and the predetermined conditions.

12 Claims, 13 Drawing Sheets

(58) Field of Classification Search
    USPC .............. 707/603, 622, 736, 769, 770, 802,
                        707/999.003, 602, 783, 999.102, 999.104
    See application file for complete search history.

(56)                    References Cited

U.S. PATENT DOCUMENTS

| | | | |
|---|---|---|---|
| 2017/0300558 A1* | 10/2017 | Damodaran .......... | G06F 16/332 |
| 2022/0198562 A1* | 6/2022 | Cella ...................... | G06Q 40/04 |
| 2023/0173395 A1* | 6/2023 | Cella ...................... | G06Q 30/06 |
| | | | 463/25 |

* cited by examiner

900

ONE OR
MORE INPUT
PARAMETERS
605

MVA
910

DECISION
920

SYSTEM AND METHOD FOR PROCESSING AND TRANSFORMING INCOMING RESOURCES TO AUTO-CODE REPORTING PARAMETERS

This application claims the benefit of U.S. Provisional Application No. 63/251,453 filed Oct. 1, 2021, which is hereby incorporated by reference herein in its entirety.

BACKGROUND

Typically, incoming resources from one or more different data sources may not follow same file formats and may not comprise data with same naming conventions. Conventional systems do not have the capability to process different types of incoming resources in varying file formats comprising data with different naming conventions and transform the data in the incoming resources to auto-code one or more reporting parameters, where the one or more reporting parameters may be used as an input in one or more external processes. As such, there exists a need for a system to process and transform incoming resources to auto-code reporting parameters.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for processing and transforming incoming resources to auto-code reporting parameters. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises computer program instruction code, such that when the instruction code is operated by the computer processing device, the computer processing device performs certain operations to carry out the invention.

In some embodiments, the invention receives one or more resources from one or more data sources, pre-processes the one or more resources to extract one or more input parameters, processes the one or more input parameters, via a decisioning engine, auto-codes one or more reporting parameters based on processing the one or more input parameters, via the decisioning engine, checks for predetermined conditions based on one or more predetermined rules, and prepares an output file comprising the auto-coded one or more reporting parameters and the predetermined conditions.

In some embodiments, processing the one or more input parameters, via the decisioning engine comprises extracting one or more top rules from a rules database associated with each of the one or more reporting parameters, extracting one or more post rules from the rules database associated with each of the one or more reporting parameters, applying the one or more top rules and the one or more post rules to the one or more input parameters to generate one or more decisions associated with each of the one or more reporting parameters, wherein the auto-coding of the one or more reporting parameters is performed based on the one or more decisions.

In some embodiments, the invention applies the one or more top rules and the one or more post rules to the one or more input parameters consecutively.

In some embodiments, the one or more post rules change the one or more decisions generated using the one or more top rules when the one or more top rules and the one or more post rules are applied consecutively.

In some embodiments, applying the one or more top rules and the one or more post rules to the one or more input parameters comprises performing one or more logical operations on one or more fields associated with each of the one or more top rules and the one or more post rules.

In some embodiments, the invention calculates the one or more fields associated with each of the one or more top rules and the one or more post rules based on (i) mapping one or more fields with one or more data fields present in the one or more resources and (ii) performing one or more data transformations on data present in the one or more data fields.

In some embodiments, the invention determines that at least one rule of the one or more top rules or the one or more post rules is matched for each of the one or more reporting parameters, terminates execution of remaining top rules of the one or more top rules or remaining post rules of the one or more post rules, and generates the one or more decisions based on the at least one rule.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
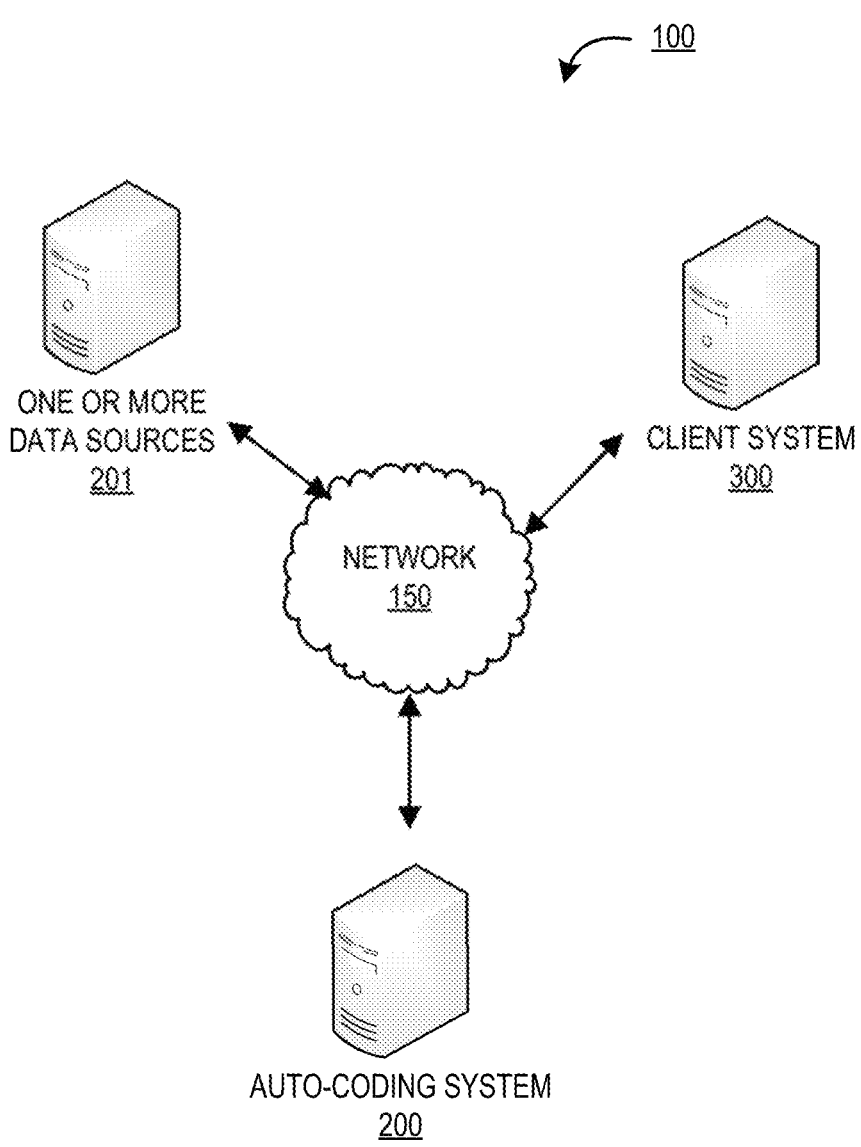
Figure 2:
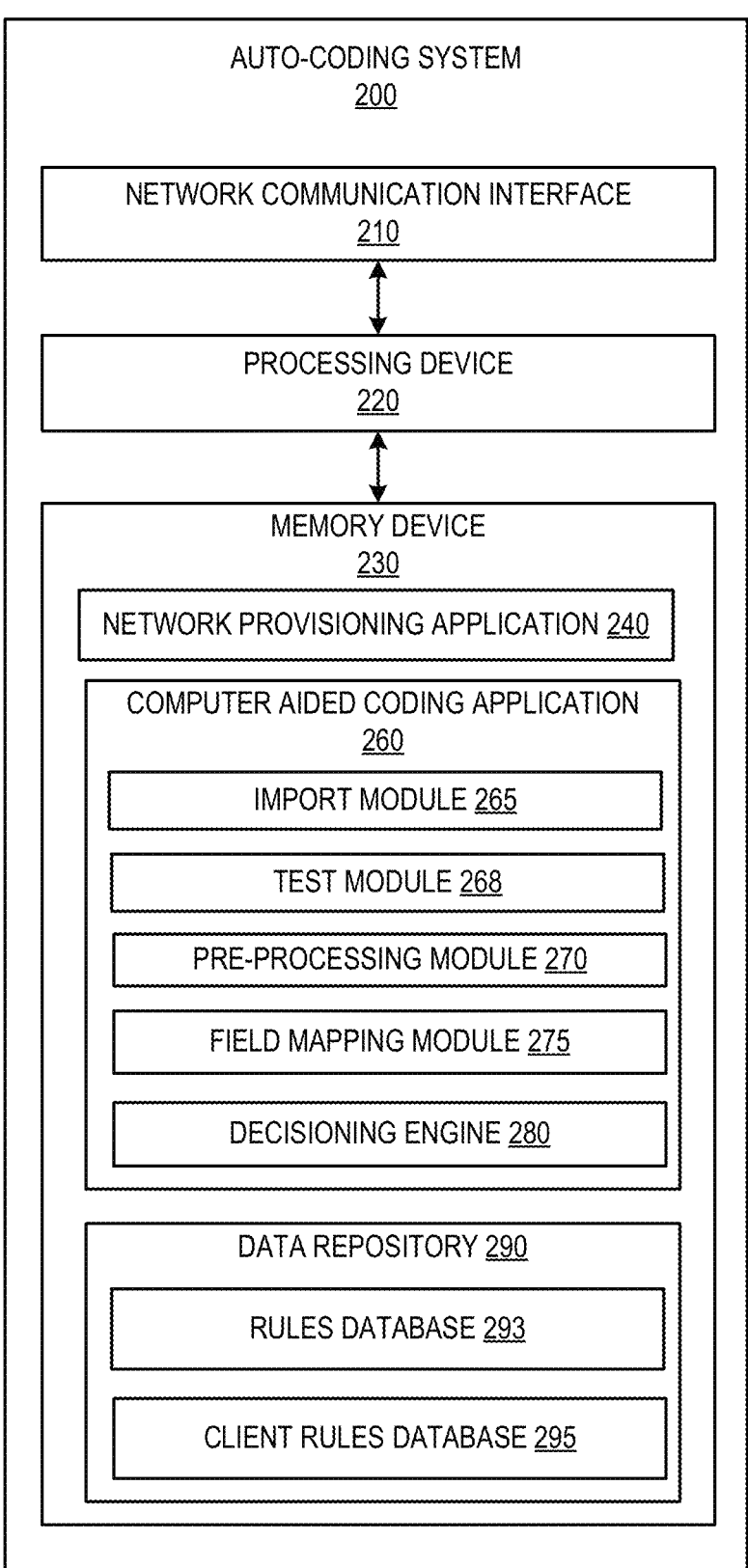
Figure 3:
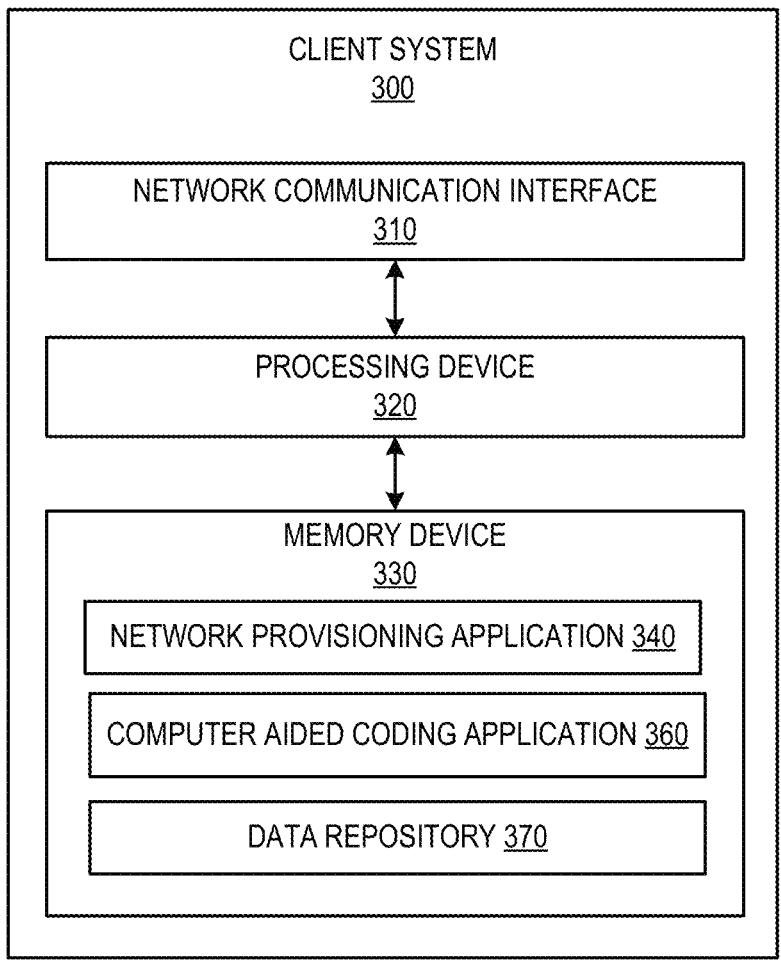
Figure 4:
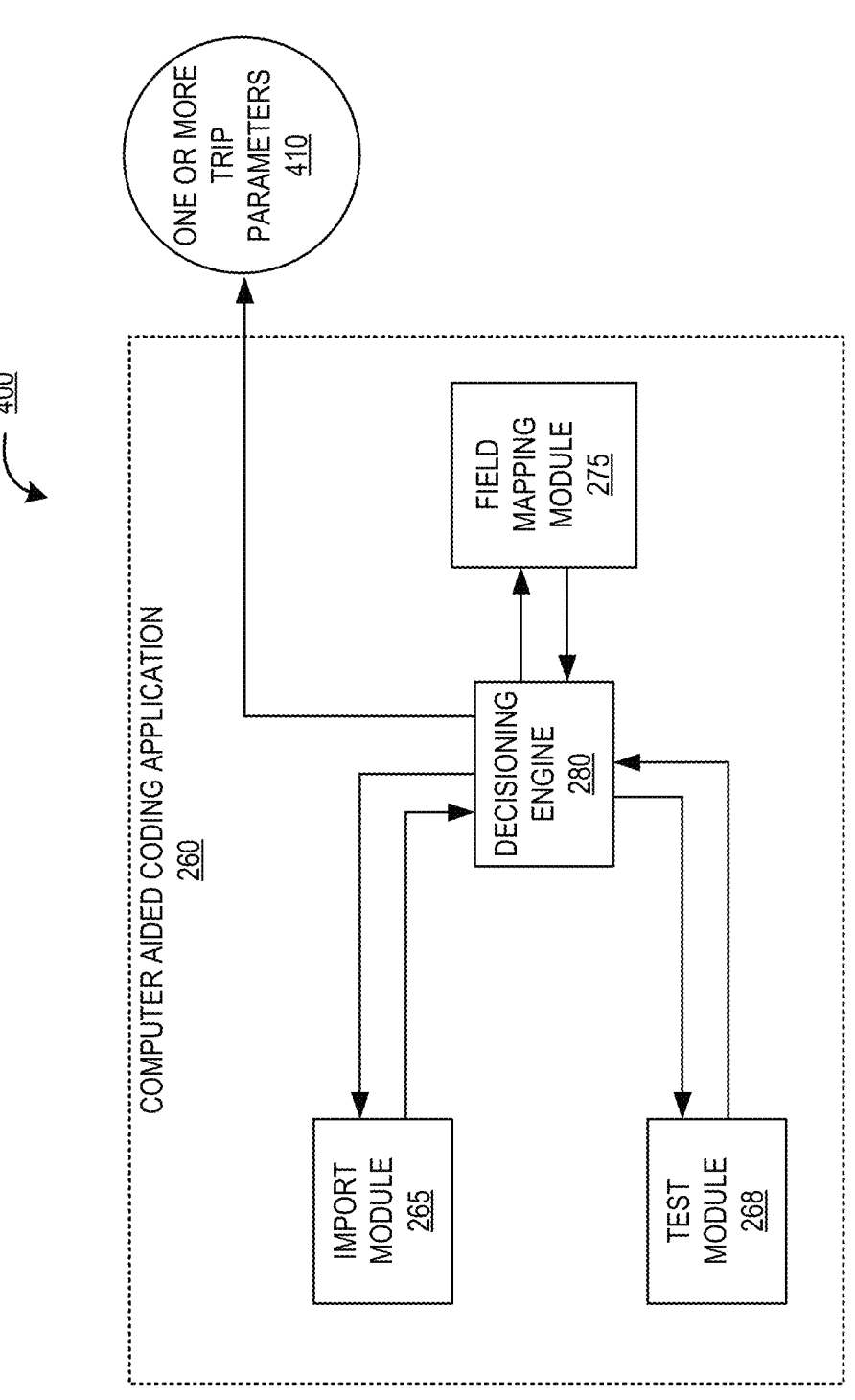
Figure 5:
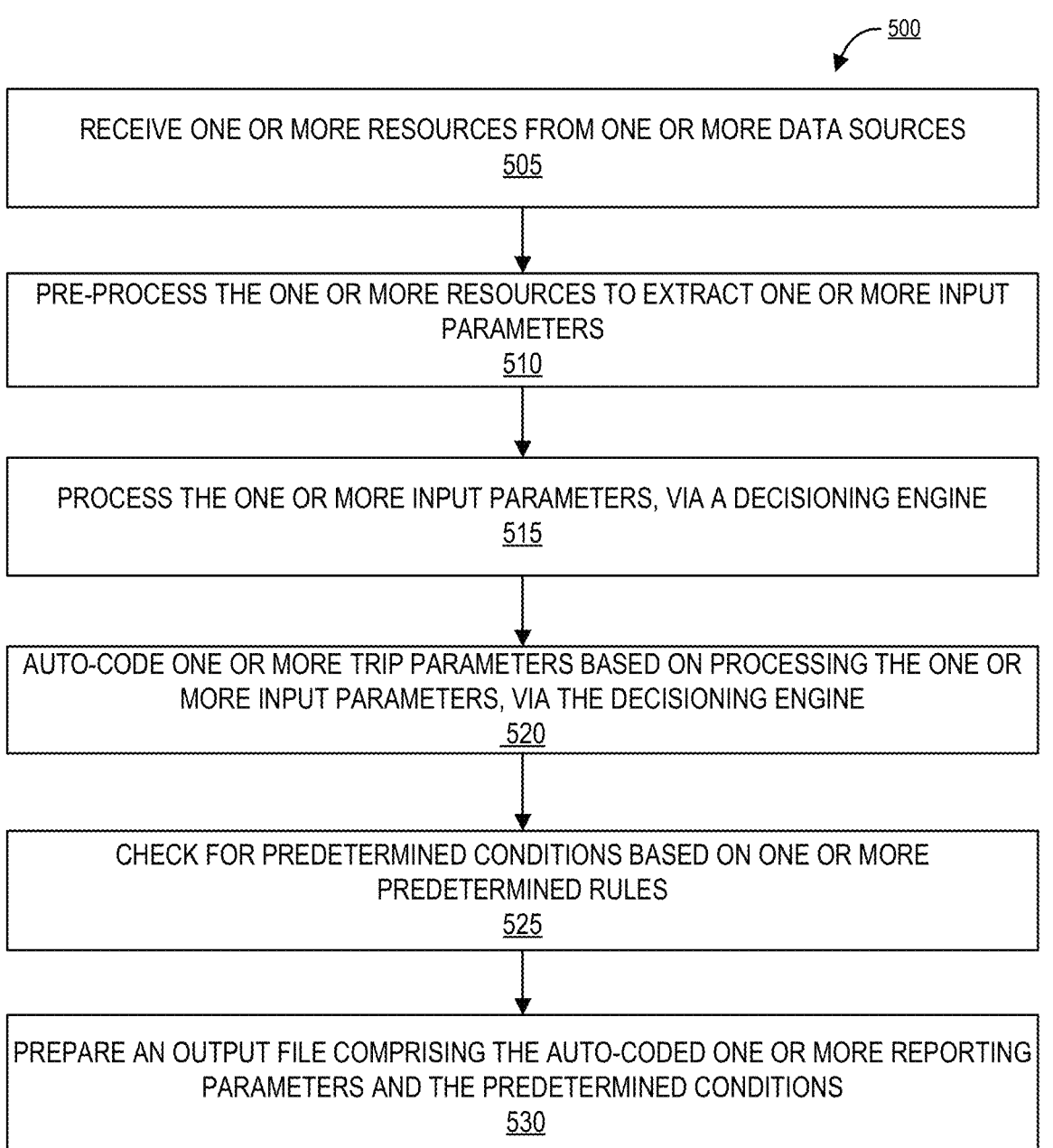
Figure 6A:
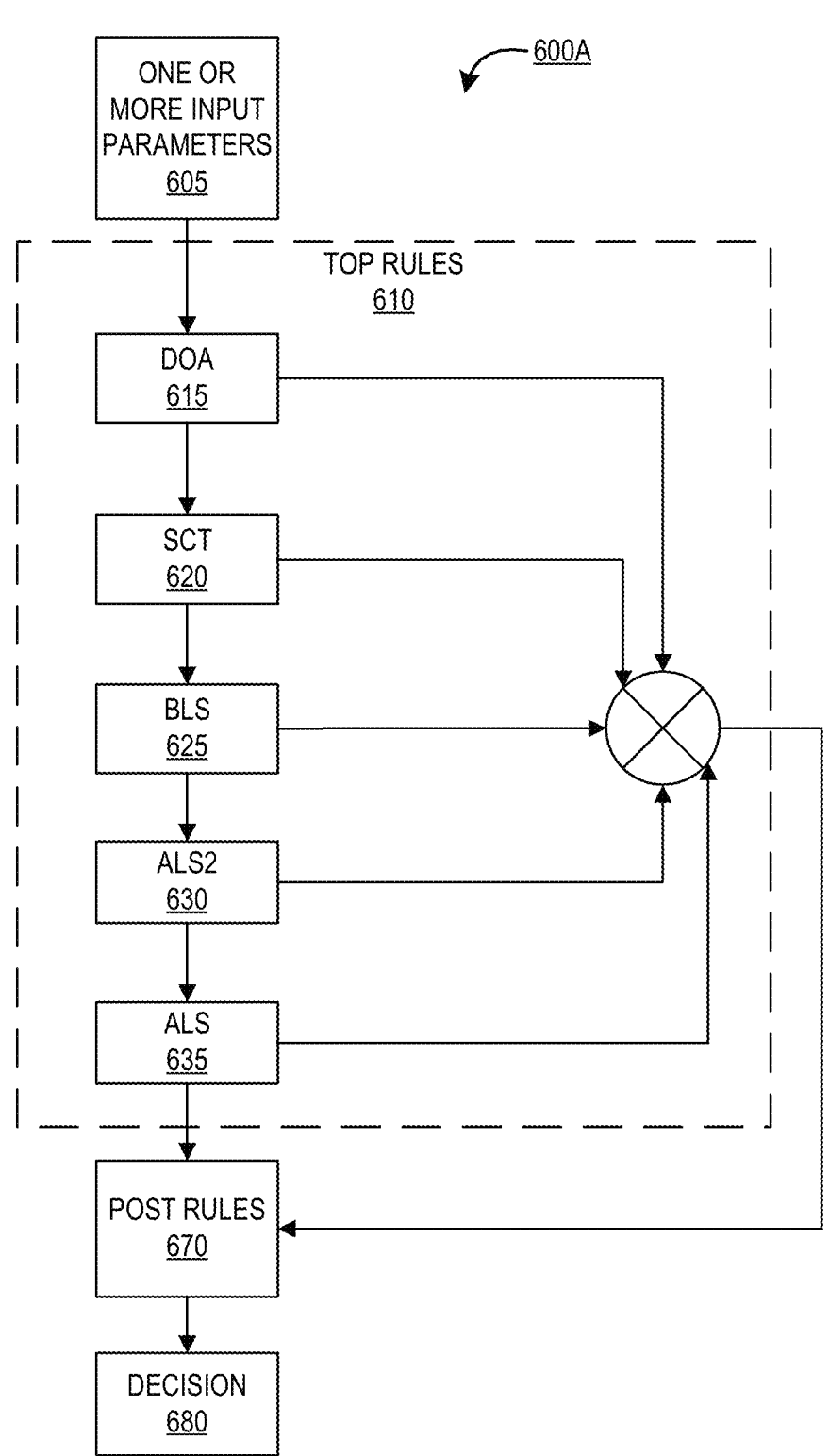
Figure 6B:
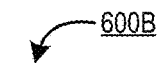
Figure 6B:
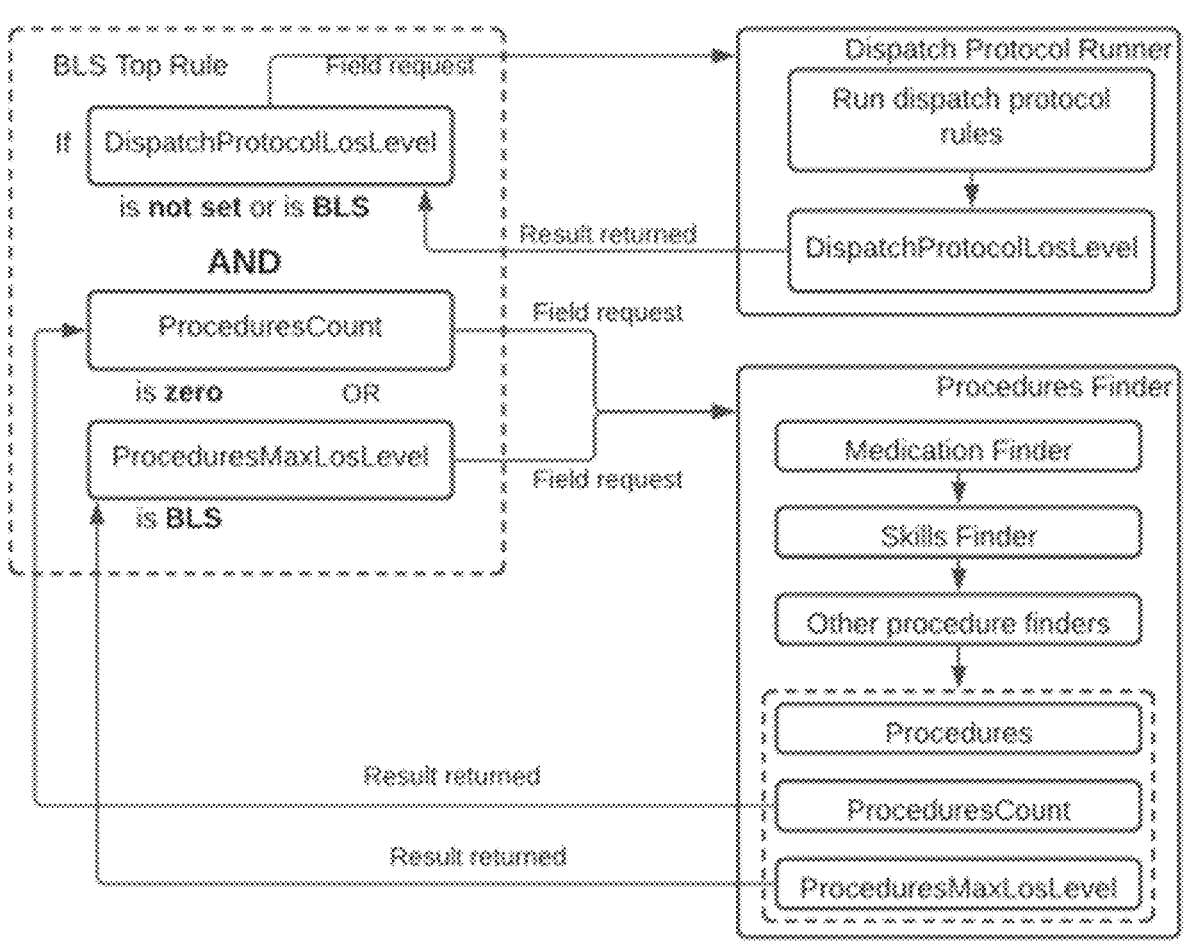
Figure 7A:
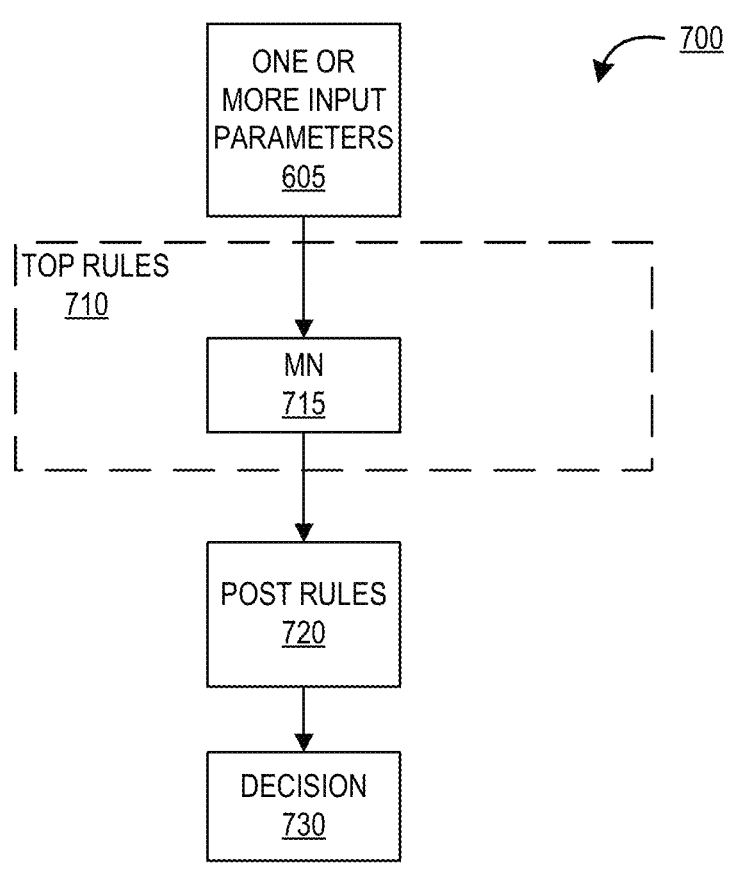
Figure 7B:
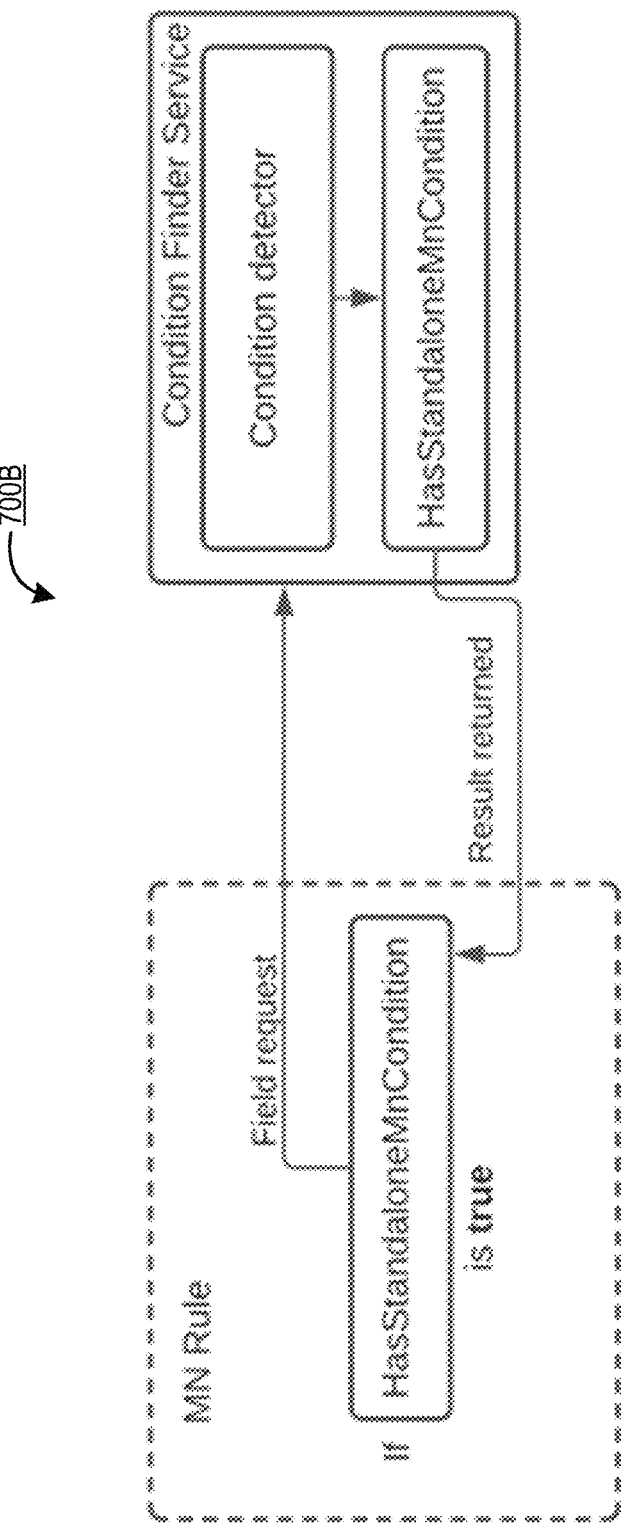
Figure 8A:
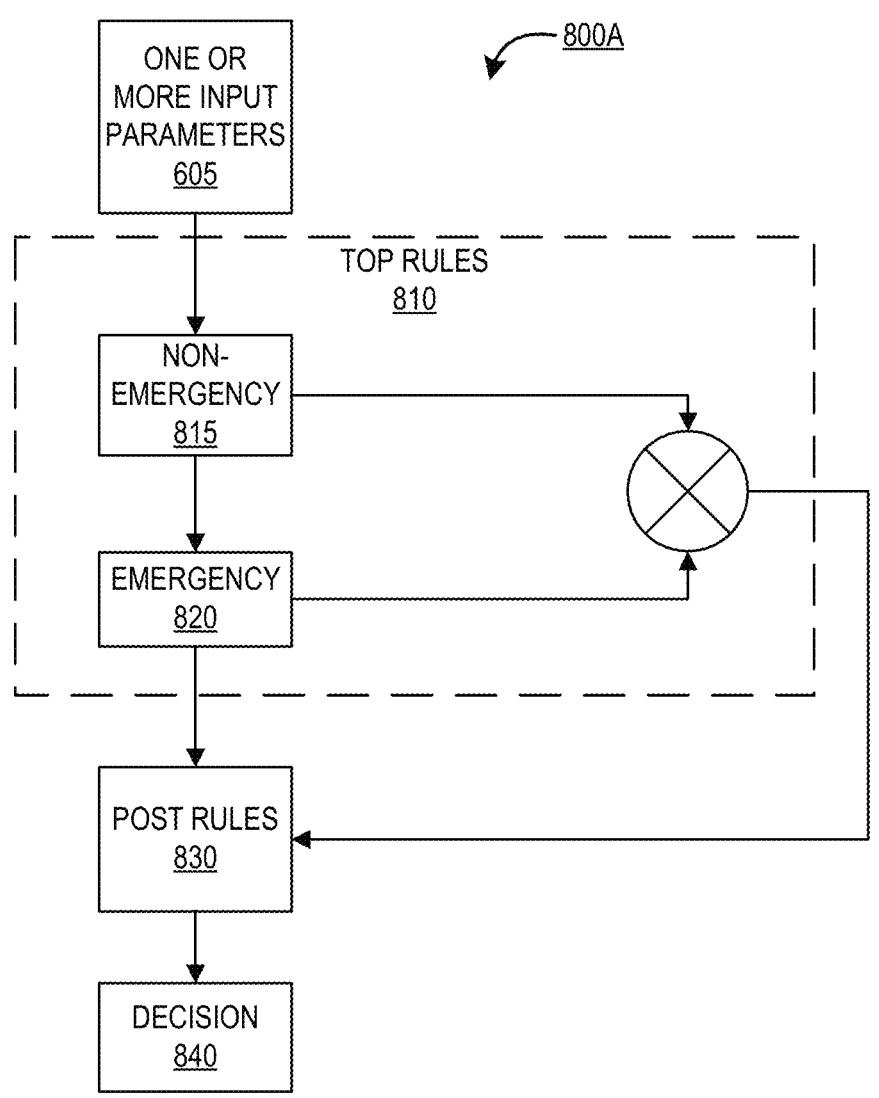
Figure 8B:
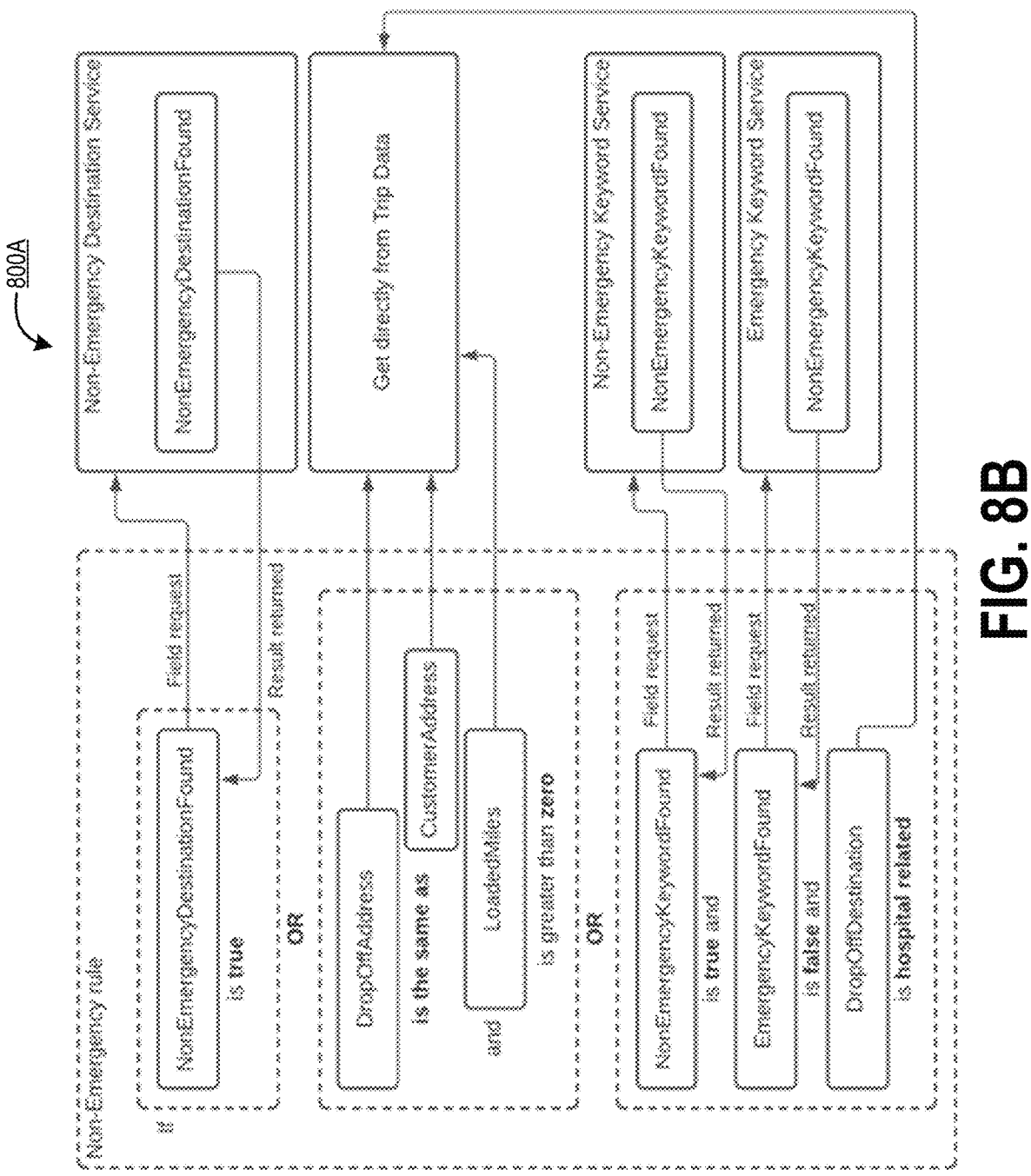
Figure 9:
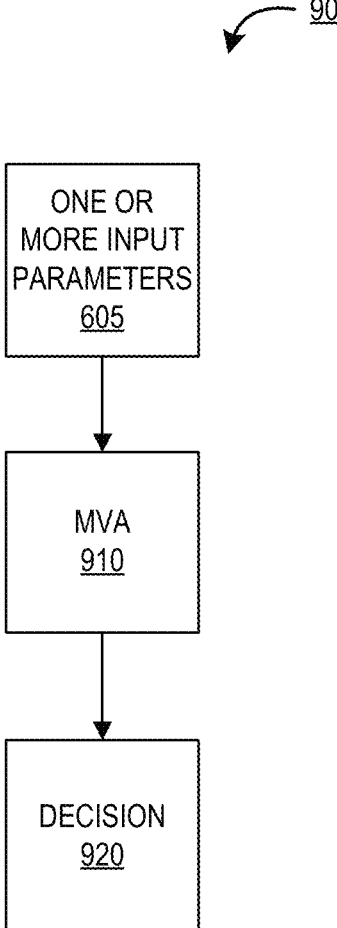
Figure 10:
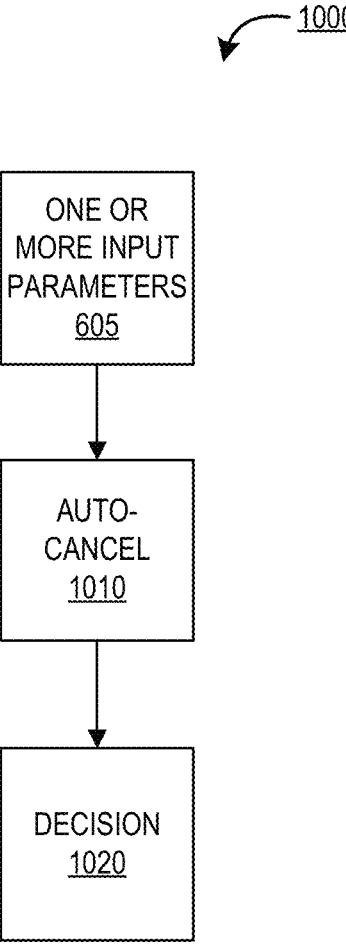

Having thus described embodiments of the invention in general terms, reference will now be made to the accompanying drawings, wherein:

FIG. 1 provides a block diagram illustrating a system environment for processing and transforming incoming resources to auto-code reporting parameters, in accordance with an embodiment of the invention;

FIG. 2 provides a block diagram further illustrating the auto-coding system of FIG. 1, in accordance with an embodiment of the invention;

FIG. 3 provides a block diagram further illustrating the client system of FIG. 1, in accordance with an embodiment of the invention;

FIG. 4 provides a block diagram illustrating one or more modules of a Computer Aided Coding (CAC) application of the auto-coding system, in accordance with an embodiment of the invention;

FIG. 5 provides a block diagram illustrating a process flow for processing and transforming incoming resources to auto-code reporting parameters, in accordance with an embodiment of the invention;

FIG. 6A provides a block diagram illustrating a process flow for auto-coding Level of Service reporting parameter, in accordance with an embodiment of the invention;

FIG. 6B provides a block diagram illustrating a process flow for determining one or more fields required for auto-coding the Level of Service reporting parameter, in accordance with an embodiment of the invention;

FIG. 7A provides a block diagram illustrating a process flow for auto-coding the Medical Necessity reporting parameter, in accordance with an embodiment of the invention;

FIG. 7B provides a block diagram illustrating a process flow for determining one or more fields required for auto-coding the Medical Necessity reporting parameter, in accordance with an embodiment of the invention;

FIG. 8A provides a block diagram illustrating a process flow for auto-coding priority reporting parameter, in accordance with an embodiment of the invention;

FIG. 8B provides a block diagram illustrating a process flow for determining one or more fields required for auto-coding the priority reporting parameter, in accordance with an embodiment of the invention;

FIG. 9 provides a block diagram illustrating a process flow for determining the existence of predefined conditions, in accordance with an embodiment of the invention; and FIG. 10 provides a block diagram illustrating a process flow for determining whether the predetermined condition flag should be canceled, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

As used herein, the term "data sources" may include systems associated with any organization that provides one or more resources (e.g., data files) as inputs to system of the present invention. In some embodiments of this invention, the one or more data sources may be systems associated with organizations that provide emergency medical services, ambulance services, or the like. In such embodiments, the one or more resources may be electronic patient care reports. In some other embodiments, the one or more data sources may be systems associated with organizations that provide any kind of services to one or more customers. As used herein, a "client system" may be any system associated with an organization that bills the one or more customers for one or more services received from the organization or a third party. In some embodiments of this invention, the client system may be insurance companies or the like. In some embodiments, instead of providing one or more outputs to the client system, the system of the present invention may perform one or more steps associated with billing the one or more customers.

A "user interface" is any software interface that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Incoming resources from one or more different data sources may not follow same file formats and may not comprise data with same naming conventions. Such incoming resources with varying file formats need to be processed differently. For example, patient care reports received from multiple data sources associated with organizations that provide emergency medical services may not be of the same file format (e.g., Portable Document Format, web page file format, or the like). Additionally, these organizations may not adhere to same naming standards or conventions when describing the services received by one or more patients in the patient care reports. These incoming resources, with varying file formats and comprising data with different naming conventions, are difficult to process while generating bills associated with the services received by the patients. Moreover, the process of bill generation may require decision making related to one or more parameters/one or more reporting parameters, where the decision making may vary for each of the incoming patient care reports depending on the location of the patient/customer, organization providing the services, regulations related to billing (e.g., state laws, federal laws, or the like), and/or the like. Conventional systems existing today do not have the capability to process such incoming resources and therefore, there exists a need for a system to overcome the aforementioned problems. The system of the present invention solves these problems by efficiently and accurately processing and transforming the incoming resources to auto-code one or more parameters used for generating bills associated with services received by one or more customers. It should be understood that the solution provided by the present invention is not limited to the field of generating bills associated with emergency medical services received by patients and may be applicable to other fields associated with generated bills related to services received by one or more customers.

FIG. 1 provides a block diagram illustrating a system environment 100 for processing and transforming incoming resources to auto-code reporting parameters, in accordance with an embodiment of the invention. As illustrated in FIG. 1, the environment 100 includes an auto-coding system 200, one or more data sources 201, and a client system 300. One or more users may be included in the system environment 100, where the users interact with the other entities of the system environment 100 via a user interface provided by the auto-coding system 200. In some embodiments, the one or more user(s) may be employees of an organization associated with the client system 300 and/or the auto-coding system 200.

The auto-coding system 200 is a system of the present invention for performing one or more process steps described herein. The one or more data sources 201 may be any systems associated with an organization that provides one or more resources to the auto-coding system 200. The one or more resources may be any data files that comprise data associated with the one or more process flows performed by the auto-coding system 200. For example, the one or more data sources 201 may be systems associated with organizations that provide emergency medical services, ambulance services, or the like that provide electronic patient care reports. In some embodiments, the one or more resources may be received from multiple data sources and may be associated with multiple file formats (e.g., Portable Document Format (PDF), web page file format, text file format, or the like). In some embodiments, each of the one or more resources received from the multiple data sources may comprise data with different naming conventions. The client system 300 may be system associated with an organization that bills the one or more customers for one or more services received from the organization or a third party based on the outputs provided by the auto-coding system 200. In some embodiments of this invention, the client system may be insurance companies or the like. In some embodiments, instead of providing one or more outputs to the client system, the system of the present invention may perform one or more steps associated with billing the one or more customers.

The auto-coding system 200, the one or more data sources 201, and the client system 300 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes at least the Internet. In general, the auto-coding system 200 is configured to communicate information or instructions with the one or more data sources 201 and/or the client system 300 across the network 150.

FIG. 2 provides a block diagram illustrating the auto-coding system 200, in greater detail, in accordance with embodiments of the invention. As illustrated in FIG. 2, in one embodiment of the invention, the auto-coding system 200 includes one or more processing devices 220 operatively coupled to a network communication interface 210 and a memory device 230.

It should be understood that the memory device 230 may include one or more databases or other data structures/repositories. The memory device 230 also includes computer-executable program code that instructs the processing device 220 to operate the network communication interface 210 to perform certain communication functions of the auto-coding system 200 described herein. For example, in one embodiment of the auto-coding system 200, the memory device 230 includes, but is not limited to, a network provisioning application 240, a Computer Aided Coding (CAC) application 260 comprising one or more modules, and a data repository 290. The one or more modules may comprise at least an import module 265, a test module 268, a pre-processing module 270, a field mapping module 275, a decisioning engine 280, or the like to perform one or more steps associated with process flows implemented by the auto-coding system 200 as discussed below. In some embodiments, each of the one or more modules may be part of a single module. In some embodiments, at least two modules of the one or more modules may be combined into a single module. The computer-executable program code of the network provisioning application 240 and the Computer Aided Coding (CAC) application 260 may perform any logical, data-transformation, data-extraction, and data-storing functions of the auto-coding system 200 described herein, as well as communication functions of the auto-coding system 200.

The data repository 290 may comprise a rules database 293, a client rules database 295, and any other data that is received, processed, transformed, and/or needed by the auto-coding system to perform one or more steps of the process flows described herein. The network provisioning application 240 and the Computer Aided Coding (CAC) application 260 may be configured to store data in the data repository 280 or to use the data stored in the data repository 280 when communicating through the network communication interface 210 with the one or more data sources 201 and the client system 300 to perform one or more process steps described herein.

FIG. 3 provides a block diagram illustrating the client system 300 in greater detail, in accordance with embodiments of the invention. As illustrated in FIG. 3, in one embodiment of the invention, the client system 300 includes one or more processing devices 320 operatively coupled to a network communication interface 310 and a memory device 330.

It should be understood that the memory device 330 may include one or more databases or other data structures/repositories. The memory device 330 also includes computer-executable program code that instructs the processing device 320 to operate the network communication interface 310 to perform certain communication functions of the client system 300 described herein. In one embodiment of the client system 300, the memory device 330 includes, but is not limited to, a network provisioning application 340, a Computer Aided Coding application 360, and a data repository 370 comprising data processed or accessed by one or more applications in the memory device 330. Computer Aided Coding application 360 may be a client-side application provided by the auto-coding system 200, where the Computer Aided Coding application 360 may be configured to perform one or more operations instructed by the auto-coding system 200 on the client system 300. The computer-executable program code of the network provisioning application 340 and the Computer Aided Coding application 360 may instruct the processing device 320 to perform any logical, data-processing, and data-storing functions of the client system 300 described herein, as well as communication functions of the client system 300. The network provisioning application 340 and the Computer Aided Coding application 360 may be configured to invoke, use, and/or store data in the data repository 370 when communicating through the network communication interface 310 with the auto-coding system 200.

FIG. 4 provides a block diagram illustrating one or more modules of a Computer Aided Coding (CAC) application 260 of the auto-coding system 200, in accordance with an embodiment of the invention. As shown, the import module 265 allows the auto-coding system 200 to import one or more incoming resources from the one or more data sources 201. In some embodiments, the import module 265 allows the auto-coding system 200 to import pre-processed data derived from the one or more incoming resources received from the one or more data sources 201. In such embodiments, a third-party application may perform the pre-processing of the one or more incoming resources. In alternate embodiments, the auto-coding system 200, after importing the one or more incoming resources via the import module 265, pre-processes the one or more incoming resources, via the pre-processing module 270. After pre-processing, the results are stored in a database as records. In some embodiments, the results may be stored across multiple tables in the database. In some other embodiments, the results may be stored in a single table in the database. In some embodiments, the database may be a SQL database. Once a record is created in the SQL database, the import module 265 imports the record comprising the pre-processed data from the one or more incoming resources and provides the pre-processed data to the decisioning engine 280, where the decisioning engine 280 performs one or more operations to auto-code one or more reporting parameters 410, where the one or more reporting parameters 410 may be consumed by the client system 300. The decisioning engine 280 may comprise one or more sub-modules for auto-coding each of the one or more reporting parameters, where each of the one or more sub-modules may make decisions based on layers of rules as explained in FIGS. 6A through 10.

As shown, the Computer Aided Coding (CAC) application 260 further comprises a test module 268 which may be an internal Application Programming Interface (API) that allows users and/or administrators of the Computer Aided Coding (CAC) application 260 to perform one or more tests and/or test one or more bug fixes associated with the Computer Aided Coding (CAC) application 260.

As shown, the field mapping module 275 maps one or more fields required by the CAC application 260 with common trip data fields provided by the one or more incoming resources. Mapping may be performed based on one or more data transformations. In some embodiments, field mapping module 275 may read one or more rows from one or more tables in the database and may remove unnecessary spaces from some fields. In some embodiments, field mapping module 275 may read one or more rows from one or more tables in the database and may change format of the data present in the one or more rows. For example, the field mapping module 275 may read one or more rows comprising medical encounter information present in an electronic patient care report and may transform date of birth of a patient into number of days since birth. In some embodiments, field mapping module 275 may read one or more rows relating to the medical encounter from one or more tables in the database and may join data in multiple rows into one continuous string of text.

FIG. 5 provides a block diagram illustrating a process flow for processing and transforming incoming resources to auto-code reporting parameters, in accordance with an embodiment of the invention.

As shown in block 505, the system receives one or more resources from one or more data sources. In one example, the system may receive electronic patient care report from an emergency medical services system, where the electronic patient care report may comprise at least information associated with one or more services provided to a patient. The one or more resources may further comprise personal information associated with the patient, medical history associated with the patient, complaint associated with the medical trip (also referred to as medical encounter) associated with the electronic patient care report, medications the patient may be taking, clinical signs, mechanism of injury, presumptive diagnosis, treatments administered pre-hospital, and the like. The one or more resources may be filled out by emergency medical services personnel (e.g., Emergency Medical Technicians (EMTs), paramedics, or the like) during the medical trip. Once data is entered into a user interface by the personnel, the data is collected and stored as an electronic patient care report for that medical trip associated with the patient. As explained above, each of the personnel may follow different naming conventions while inputting the data associated with the medical trip.

As shown in block 510, the system pre-processes the one or more resources to extract one or more input parameters. The system may pre-process the one or more resources and may strip information not required to generate the one or more reporting parameters. In some embodiments, the pre-processing of the one or more resources may be performed by a third party application and the resulting data may be extracted by the system, thereby reducing the processing power required by the decisioning engine and improving the efficiency of the process as the system processes multiple resources at the same time to output one or more reporting parameters for each of those resources.

As shown in block 515, the system processes the one or more input parameters, via a decisioning engine. The decisioning engine processes the one or more input parameters and outputs one or more decisions based on one or more rules. In some embodiments, separate set of rules may exist for each of the decisions outputted by the decisioning engine as explained in detail below. As shown in block 520, based on the decisions outputted by the decisioning engine, the system auto-codes the one or more reporting parameters based on processing the one or more input parameters. For example, the system may receive electronic patient care report from an emergency medical services system and may process the one or more input parameters present in the electronic patient care report to auto-code one or more reporting parameters comprising at least Level of Service (LOS), Medical Necessity (MN), priority, or the like. One or more rules associated with making decisions associated with each of the one or more reporting parameters are discussed in detail in FIGS. 6A through 8B. The one or more reporting parameters comprising Level of Service (LOS), Medical Necessity (MN), and priority may be used by client systems to perform billing associated with one or more services received by a patient associated with the electronic patient care report.

As shown in block 525, the system checks for predefined conditions based on one or more predetermined rules. Continuing with the previous example, the system may then determine if a medical encounter described in the electronic patient care report is associated with a Motor Vehicle Accident (MVA) and then determines if the encounter should be canceled.

As shown in block 530, the system prepares an output file comprising the auto-coded one or more reporting parameters and the predefined conditions. In some embodiments, the output file may then be consumed by the client system. In some embodiments, the system may perform billing based on the output file. The output file may be referred to as medical encounter file comprising medical encounter data (e.g., trip data).

FIG. 6A provides a block diagram illustrating a process flow for auto-coding the Level of Service (LOS) reporting parameter, in accordance with an embodiment of the invention. As shown, the sub-module for auto-coding the LOS parameter in the decisioning engine 280, performs one or more steps based on one or more layers of rules to generate a decision 680 that is associated with the LOS. As shown, the one or more input parameters 605 calculated in block 510 of FIG. 5 are provided to the LOS sub-module and upon receiving the one or more input parameters 605, the LOS sub-module extracts top rules 610 and post rules 670 from a database (e.g., rules database 293) and processes the one or more input parameters 605 based on the top rules 610 and the post rules 670 consecutively. As shown, the top rules 610 further comprise rules associated with determining LOS comprising Dead on Arrival (DOA) rule 615, Specialty Care Transport (SCT) rule 620, Basic Life Support (BLS) rule 625, Advanced Life Support Level 2 (ALS2) rule 630, and Advanced Life Support (ALS) rule 635. In some embodiments, the top rules 610 may be configured by a user (e.g., administrator associated with the auto-coding system 200 or employee associated with the client system 300) via a user interface provided by the auto-coding system 200. Each of the top rules 610 extracted from the database may be implemented and processed by applying logic. For example, the DOA rule 615 is calculated based on performing one or more logical operations comprising:

```
If
      PronouncementOfDeath is true and
      IsTransportedToAirProvider is false
and (
      (
      PronouncementOfDeathDateTime is greater than
      AtSceneDateTime and less than TransportDateTime
      )
      or (TransportationToMorgue is true)
      or (LoadedMiles is less or equal to 0 or TransportDate-
            Time is greater than 0)
      )
```

In another example, the BLS rule 625 is calculated based on performing one or more logical operations comprising: If (DispatchProtocolLosLevel is not set or it is BLS) and (ProceduresCount is 0 or ProceduresMaxLosLevel is BLS).

In another example, the SCT rule 620 is calculated based on performing one or more logical operations comprising:

```
If
      (MinimumEmtLevel is greater or equal to 9)
      and (HasSpecialtyCareTransportProcedures is true)
      and (
            (PickupFacilityType is H and DropOffFacilityType is H)
            or (PickupFacilityType is H and DropOffFacilityType is
      N)
            or (PickupFacilityType is N and DropOffFacilityType is
      H)
            ), where H is Hospital and N is a nursery home.
```

The LOS sub-module processes the top rules 610 in a sequential manner and once a match for a rule of the top rules 610 is determined, the decision 680 is instantly made without going through the remaining rules. In specific embodiments, where no rule of the top rules 610 is matched, the LOS parameter is determined to be unknown. After processing the top rules 610, the LOS sub-module processes post rules 670. In some embodiments, the post rules may change the decision 680 determined based on the top rules 610. The post rules 670 may comprise checking for one or more services/flags which comprise Dead On Arrival (DOA) Flag Service, Reason Service, Treatment No Transport (TNT) service, Dead On Arrival (DOA) service, Specialty Care Transport (SCT) service, dispatch protocol service, crew credentials check service, Electrocardiogram (ECG)

service, Emergency Triage, Treat and Transport (ET3) service, Client Specific Service and the like.

The LOS sub-module runs the DOA Flag Service if DOA is not already detected, where the LOS sub-module checks for pronouncement of death field itself or whether pronouncement of death keywords are found in the one or more input parameters. If the sub-module detects pronouncement of death field or other death keywords, the LOS sub-module adds a review flag for DOA, where a user may perform the review based on the review flag.

The LOS sub-module runs a reason service to add a list of procedures as a reason for ALS and additional reasons discovered for ALS2 results. The sub-module runs TNT service for checking whether the medical encounter is a TNT or a potential TNT and upon determining the medical encounter is a TNT or a potential TNT, the sub-module adds a flag for TNT and a review flag for TNT.

The LOS sub-module runs a potential DOA service if DOA is not already detected. This service checks for specific keywords like "DNR", "pulse less", and similar in pronouncement of death keywords and if they are found, the sub-module will add a review flag for DOA.

The LOS sub-module runs an SCT service to check if SCT or potential SCT matches and adds additional SCT procedures text to reason information. If the full SCT is not matched then this service runs rules for potential SCT, using pickup and drop off facility types, crew level checks, and/or the like, and if a match is found, review flag is added for SCT.

The LOS sub-module runs a dispatch protocol service to add a reason text if dispatch protocol was detected.

The LOS sub-module runs a crew credentials check service to verify Emergency Medical Technician (EMT) credentials and can change the LOS based on the result. The LOS sub-module makes determinations for SCT and other levels of service based on where the EMT Credential falls in the list. For example, any EMT Credential level 8 or higher in this list could be considered in determining SCT if all other criteria were met.

The LOS sub-module runs a ECG service to check if an ECG procedure is detected and adds additional flags whether ECG acquisition or interpretation was detected.

The LOS sub-module runs an ET3 service to check if ET3 was found in Medical encounter's disposition and adds ET3 flag if ET3 is found.

The LOS sub-module runs a Client Specific Service if required by Medical encounter's client, applying the result to the medical encounter based on the set action for the client specific rule. Client specific rules affecting LOS are not based on Medical encounter Dispatch or ALS Assessment. When a specific rule associated with the one or more services is matched, a corresponding action is applied to the medical encounter.

FIG. 6B provides a block diagram illustrating a process flow for determining one or more fields required for auto-coding the LOS reporting parameter, in accordance with an embodiment of the invention. The one or more rules discussed in FIG. 6A may require detection or calculation of one or more fields. A detection service (also referred to as detector service) present in the LOS sub-module uses coded logic and mapping data to produce results for such fields. For example, when BLS rule 625 is being run by the LOS sub-module, the rule may require fields such as Dispatch-ProtocolLosLevel, ProceduresCount and Procedures-MaxLosLevel as explained above. These fields are not directly provided in the medical encounter data present in the one or more records. The detection service calculates these fields associated with the BLS rule 625 as shown in FIG. 6B.

The detector services in the LOS sub-module may further comprise one or more sub-services such as Pronouncement of Death service, Transportation to Morgue service, Procedure Finder service, EMT service, Dispatch Protocol Service, and Treatment No Transport Service.

The detector services in the LOS sub-module runs the Pronouncement of Death service for checking medical encounter's narrative for pronouncement of death keywords coded in the service and provides PronouncementOfDeath, PronouncementOfDeathDateTime and PronouncementOfDeathKeyword fields.

The detector services in the LOS sub-module runs the Transportation to Morgue service to check the narrative, chief complaint, disposition, and various other fields in medical encounter data in search for MFH keywords. These keywords are managed by an administrator of the auto-coding system 200, via the user interface provided by the auto-coding system, and provided as TransportationToMorgue and TransportationToMorgueKeyword fields.

The detector services in the LOS sub-module runs the Procedure Finder service to check medical encounter data to detect various procedures performed in it. The Procedure Finder detects multiple types of procedures and provides fields comprising ProceduresCount, ProceduresMaxLosLevel, ProceduresMinALSLevel, Procedures, HasSpecialtyCareTransportProcedures, IsEcgProcedureDetected, IsMedicationDetected, IsIvDetected, Is12LeadEkgDetected, and IsEcgProcedureInterpretationDetected.

The detector services in the LOS sub-module runs the EMT service to detect levels of EMT Crew which performed the actions in the medical encounter data. As a result, the detector services provides fields comprising MinimumEmtLevel, CrewLevels, and IsSCTCrewConditionSatisfied. The levels referenced by the detector services comprises First Responder, First Responder Defibrillator, Emergency Care Provider, Emergency Medical Technician, Advanced Emergency Medical Technician, Emergency Medical Technician—Intermediate, Cardiac Technician, Cardiac Rescue Technician, Emergency Medical Technician—Paramedic, Critical Care Paramedic, Respiratory Therapist, Critical Care, Registered Nurse, Mobile Intensive Care Nurse, NICU, and PICU.

The detector services runs the Dispatch Protocol Service to determine DispatchProtocolLosLevel field based on specific dispatch protocol rules, where the dispatch protocol rules may be defined by a user via a user interface provided by the auto-coding system 200. The dispatch protocol rules may comprise rules based on (i) EMD Card field, Narrative field, Response Code, or Dispatch Priority, and 'Alpha, Bravo, Charlie, Delta, Echo, Omega' responses; (ii) EMD Card field, Narrative field, Response Code, or Dispatch Priority, and 'Alpha, Bravo, Charlie, Delta, Echo, Omega' responses AND ALS Assessment treatment or EKG treatment; (iii) ALS Assessment treatment; (iv) EMD Card field, Narrative field, Zone, or Dispatch Nature, and 'P1 or P2,'; (v) Response Priority or Response Mode and 'SFP1 or SFP2,' (vi) transport to Air Care Provider; (vii) Dispatch Priority and 'P1 or Priority 1,' (viii) EMD Card field and 'ALS,' (ix) Rules based on Call Type and 'BLS,'; and (x) reference of client chart and 'ALS.'

The detector services runs the Treatment No Transport (TNT) Service to check the narrative, chief complaint, disposition, and various other fields in medical encounter data in search for TNT keywords. These keywords are managed by an administrator of the auto-coding system 200 via a user interface provided by the auto-coding system 200. The TNT service provides field TreatmentNoTransport.

FIG. 7A provides a block diagram illustrating a process flow for auto-coding Medical Necessity (MN) reporting parameter, in accordance with an embodiment of the invention. As shown, the sub-module for auto-coding Medical Necessity (MN) parameter in the decisioning engine 280, performs one or more steps based on one or more layers of rules to generate a decision 730 that is associated with the Medical Necessity. As shown, the one or more input parameters 605 calculated in block 510 of FIG. 5 are provided to the Medical Necessity (MN) sub-module and upon receiving the one or more input parameters 605, the Medical Necessity (MN) sub-module extracts top rules 710 and post rules 720 from a database (e.g., rules database 293) and processes the one or more input parameters 605 based on the top rules 710 and the post rules 720 consecutively. The top rules 710 comprise Medical Necessity (MN) rule 715 as shown. If the MN rule is not satisfied, then the Medical Necessity is Not a Medical Necessity (non-MN). The MN sub-module, after the processing the top-rules 710, processes the post rules 720. In some embodiments, the post rules 720 may be hardcoded rules that implement logic for additional determinations which add additional data for auto-coding MN parameter. In some embodiments, the decision 730 resulting from top rules 710 may be overruled by the decisions resulting from post rules 720. The decision 730 comprises a decision whether a medical encounter is medically necessary or not. In some embodiments, the decision 730 is stored in the medical encounter data for the biller (e.g., client system 300) to review. Any additional flags added by the MN sub-module as described below may be reviewed by a user (e.g., employee associated with the client system 300). In some embodiments, the decisioning engine 280 also detects ICD-10 codes from conditions and writes them to the medical encounter data, where the ICD-10 codes may be utilized by the biller while generating a bill. The ICD-10 codes are codes used by healthcare providers and/or physicians to classify and code all diagnoses, symptoms and procedures recorded in conjunction with hospital care and/or pre-hospital care.

The post rules 720 may comprise checking for one or more services/flags, where the one or more services further comprise a Reason Service, Check Vitals Service, MN Flag Service, Check Alcohol Service, Check Captains Chair Service, and Covid Rule Service.

The MN sub-module runs a reason service to add additional reason information for MN and will process ICD-10 codes as an additional result. ICD-10 codes are processed in a way that they are sorted by importance and filtered out if a specific condition is not fully satisfied for it to be a full valid ICD-10 code. The ICD-10 codes may be sorted using the rules of: (i) Apply medically necessary, standalone conditions that have one or two letters within parenthesis in the description of the ICD-10 code, and do not begin with V, W, X, Y, or Z, (ii) Apply medically necessary, standalone conditions that do not have any letters within parenthesis in the description, and do not begin with V, W, X, Y, or Z, (iii) Apply medically necessary, non-standalone conditions that do not begin with V, W, X, Y, or Z, (iv) Apply medically necessary conditions that are missing supporting conditions and do not begin with V, W, X, Y, or Z, (v) Apply medically necessary, standalone conditions that have one or two letters within parenthesis in the description of the ICD-10 code, and do begin with V, W, X, Y, or Z, (vi) Apply medically necessary, standalone conditions that do not have any letters within parenthesis in the description, and do begin with V, W, X, Y, or Z, and (vii) Apply all other codes.

The MN sub-module runs a Check Vitals Service to find abnormal vitals and add them to the reason text of the result. The MN sub-module runs an MN Flag Service to determine whether to add a review flag for the MN result. This flag will be added in the case there is a general pain vital detected with no pain scale or if any non-MN keyword is found in the narrative or chief complaint.

The MN sub-module runs a Check Alcohol Service to populate reason text with the information whether severe alcohol intoxication was detected in the medical encounter or not. The MN sub-module runs a Check Captains Chair Service to check if captain's chair or jump seat was detected in narrative or chief complaint and add a flag for review. The MN sub-module runs the Covid Rule Service to check if one of the Covid keywords was detected in narrative or chief complaint and add a flag.

FIG. 7B provides a block diagram illustrating a process flow for determining one or more fields required for auto-coding the Medical Necessity reporting parameter, in accordance with an embodiment of the invention. The one or more rules discussed in FIG. 7A may require detection or calculation of one or more fields. A detection service present in the MN sub-module uses coded logic and mapping data to produce results for such fields. For example, when the MN rule 715 is being run by the MN sub-module, the rule may require fields such as HasStandaloneMnCondition as explained above. This field is not directly provided in the medical encounter data present in the one or more records. The detection service calculates these fields associated with the MN rule 715 as shown in FIG. 7B. When a particular field's value is requested by the MN sub-module, a specified service may run once and provide values associated with multiple fields.

The detector services in the MN sub-module may further comprise one or more sub-services such as Pronouncement of Death service, Procedure Finder service, EMT service, Treatment No Transport Service, Vitals Finder Service, and Condition Finder Service.

The detector service in the MN sub-module runs the Pronouncement of Death service to check the narrative of the medical encounter for pronouncement of death keywords coded in the service and provides PronouncementOfDeath, PronouncementOfDeathDateTime and PronouncementOfDeathKeyword fields.

The detector service in the MN sub-module runs the Procedure Finder service to check medical encounter data to detect various procedures performed in it. The detector service detects multiple types of procedures and provides fields: ProceduresCount, ProceduresMaxLosLevel, ProceduresMinALSLevel, Procedures, HasSpecialtyCareTransportProcedures, IsEcgProcedureDetected, IsMedicationDetected, IsIvDetected, Is12LeadEkgDetected, and IsEcgProcedureInterpretationDetected.

The detector service in the MN sub-module runs the EMT service to detect levels of EMT which performed the actions in the medical encounter data. As a result, the detector service provides fields MinimumEmtLevel, CrewLevels, and IsSCTCrewConditionSatisfied.

The detector service in the MN sub-module runs the Treatment No Transport Service to check the narrative, chief complaint, disposition, and various other fields in medical encounter data in search for TNT keywords. These keywords are managed by an administrator of the auto-coding system 200 via a user interface provided by the auto-coding system 200. As a result, the detector service provides TreatmentNoTransport field.

The detector service in the MN sub-module runs the Vitals Finder Service when vitals related fields are requested, usually by Condition Finder Service. This service uses medical encounter data to find vitals and their state level. State level can be normal, abnormal, and/or extreme. Thresholds for state levels are set by an administrator of the auto-coding system 200 via a user interface provided by the auto-coding system 200. Fields returned by this service comprise NormalVitals, AbnormalVitals, AbnormalVitalsReason, ExtremelyHighAbnormalVitals, and ExtremelyHighAbnormalVitalsReason.

The detector service in the MN sub-module runs the Condition Finder Service to check medical encounter's narrative and treatments for conditions of the patient and decides on ICD-10 codes for them. Found conditions are filtered during detection by use of detractors. In some embodiments, the MN sub-module may reference the list of Detractors to make determinations about the application of medical conditions and ICD-10 codes to medical encounters. The Medical Necessity Module finds conditions based on values found in (i) Chief Complaint, (ii) Narrative, (iii) Vitals, and (iv) Treatments. In some other embodiments, the MN sub-module may review the list of Detractors to determine if all located conditions and ICD-10 codes should be applied. The detractors work by reviewing words or phrases within the same medical encounter that could possibly change the application of conditions or ICD-10 codes. Detractors cause specific, located conditions to not be applied if the specific words or phrases are found either (i) on either side of the located condition keyword, or (ii) on the left side of the located condition keyword.

FIG. 8A provides a block diagram illustrating a process flow for auto-coding priority reporting parameter, in accordance with an embodiment of the invention. As shown, the sub-module for priority parameter in the decisioning engine 280, performs one or more steps based on one or more layers of rules to generate a decision 840 that is associated with the priority parameter. As shown, the one or more input parameters 605 calculated in block 510 of FIG. 5 are provided to the priority sub-module and upon receiving the one or more input parameters 605, the priority sub-module extracts top rules 810 from a database (e.g., rules database 293) and post rules 830 from a database (e.g., client rules database 295) and processes the one or more input parameters 605 based on the top rules 810 and the post rules 830 consecutively. The top rules 810 comprise non-emergency rule 815 and emergency rule 820. If no rule is satisfied, then the priority is determined by priority sub-module as 'unknown.' Each of the top rules 810 extracted from the database may be implemented and processed by applying logic. For example, the non-emergency rule 815 is calculated based on performing one or more logical operations comprising:

```
If(
    (NonEmergencyDestinationFound is true) or
    (
        DropOffAddress is the same as CustomerAddress
        and LoadedMiles is greater than 0
    )
) or
(
    NonEmergencyKeywordFound is true
    and EmergencyKeywordFound is false
    and DropOffDestination is hospital related
```

-continued

```

)

```

In another example, the emergency rule 820 is calculated based on performing one or more logical operations comprising:

```

If(
            EmergencyKeywordFound is true
            and NonEmergencyKeywordFound is false
        ) or
        (
            EmergencyKeywordFound is true
            and Non-EmergencyKeywordFound is true
            and DropOffDestination is hospital related
            and EmergencyDestinationFound is true
        )
        ) or
        (
            EmergencyKeywordFound is false
            and Non-EmergencyKeywordFound is false
            and (
                DropOffDestination is hospital related
                or DropOffFacility is hospital related
            )
            and PickupLocationType is NOT hospital related
        )

```

The priority sub-module, after the processing the top-rules 810, processes the post rules 830. In some embodiments, the post rules 830 may be hardcoded rules that implement logic for additional determinations which add additional data for auto-coding priority parameter. In some embodiments, the decision 840 resulting from top rules 810 may be overruled by the decisions resulting from post rules 830. In some embodiments, the post rules 830 may be client specific and may vary for different clients (e.g., based on the client rules present in the client rules database 295). The decision 840 comprises a priority value of the medical encounter. In some embodiments, the decision 840 is stored in the medical encounter data for the biller (e.g., client system 300) to review. Any additional flags added by the priority sub-module as described below may be reviewed by a user (e.g., employee associated with the client system 300).

The post rules 830 may comprise checking for one or more services/flags which comprise Check TNT service, Reason Service, Check client specific rules service, and Hospital to Hospital service. The priority sub-module runs the Check TNT service to check whether the medical encounter is TNT or potential TNT in which case flags for TNT and potential TNT for review respectively are added. The priority sub-module runs the Reason Service to add additional reason text information for Priority if one of the rules matched.

The priority sub-module runs the Check client specific rules service to add a flag if the rule is detected. Client specific rules (also referred to as client override rules) determine the priority for a medical encounter based on client protocols. In specific embodiments, there are 7 types of rules for priority client override rules comprising (i) rules based on EMD Card field, (ii) rules based on Response Priority and/or Response Mode and 'Emergency or Non-Emergency, (iii) rules based on the pickup facility, (iv) rules based on Dispatch Nature, (v) rules based on transport to an Air Care Provider, (vi) rules based on Incident Number, and (vii) rules based on EMD Card Complaint.

The priority sub-module runs the Hospital to Hospital service to check if the pickup and drop off facilities are hospitals and if they are, an additional review flag is added to the result.

FIG. 8B provides a block diagram illustrating a process flow for determining one or more fields required for auto-coding the priority reporting parameter, in accordance with an embodiment of the invention. The one or more rules discussed in FIG. 8A may require detection or calculation of one or more fields. A detection service present in the priority sub-module uses coded logic and mapping data to produce results for such fields. For example, when the emergency rule 820 is being run by the priority sub-module, the rule may require fields such as NonEmergencyDestination-Found, NonEmergencyKeywordFound and EmergencyKey-wordFound as explained above. These field are not directly provided in the medical encounter data present in the one or more records. The detection service calculates these fields associated with the emergency rule 820 as shown in FIG. 8B. When a particular field's value is requested by the priority sub-module, a specified service may run once and provide values associated with multiple fields.

The detector service in the priority sub-module may further comprise one or more sub-services such as Pronouncement of Death service, Procedure Finder service, EMT service, Treatment No Transport Service, Emergency Destination Service, Non-Emergency Destination Service, Non-Emergency Keywords Service, and Emergency Keyword Service.

The detector service in the priority sub-module runs the Pronouncement of Death service to check the narrative of the medical encounter for pronouncement of death keywords coded in the service and provides PronouncementOfDeath, PronouncementOfDeathDateTime, and Pronouncemen-tOfDeathKeyword fields.

The detector service in the priority sub-module runs the Procedure Finder service to detect various procedures performed. It detects multiple types of procedures. The detector service provides fields comprising: ProceduresCount, Pro-ceduresMaxLosLevel, ProceduresMinALSLevel, Proce-dures, HasSpecialtyCareTransportProcedures, IsEcgProce-dureDetected, IsMedicationDetected, IsIvDetected, Is12LeadEkgDetected, and IsEcgProcedureInterpretation-Detected.

The detector service in the priority sub-module runs the EMT service to detect levels of EMT crew which performed the actions in the medical encounter data. As a result, the detector service provides fields MinimumEmtLevel, Crew-Levels, and IsSCTCrewConditionSatisfied.

The detector service in the priority sub-module runs the Treatment No Transport Service to check the narrative, chief complaint, disposition, and various other fields in medical encounter data in search for TNT keywords. These keywords are managed by an administrator of the auto-coding system 200 via a user interface provided by the auto-coding system 200. As a result, the detector service provides TreatmentNoTransport field.

The detector service in the priority sub-module runs the Emergency Destination Service to check drop off destination and facility name for specific keywords to determine if the drop off destination is an emergency-type destination. The detector service provides fields comprising: EmergencyDes-tinationFound and EmergencyDestination.

The detector service in the priority sub-module runs the Non-Emergency Destination Service to check drop off destination and facility name for specific keywords to determine if drop off destination is a non-emergency type destination.

The detector service provides fields comprising: NonEmergencyDestinationFound and NonEmergencyDestination.

The detector service in the priority sub-module runs the Non-Emergency Keywords Service to search various fields in medical encounter data for non-emergency priority level keywords. The detector service provides fields comprising: NonEmergencyKeywordFound and NonEmergencyKeyword.

The detector service in the priority sub-module runs the Emergency Keyword Service to search various fields in medical encounter data for emergency priority level keywords. The detector service provides fields comprising: EmergencyKeywordFound and EmergencyKeyword.

FIG. 9 provides a block diagram illustrating a process flow for determining existence of predefined conditions, in accordance with an embodiment of the invention. The system may check for predefined conditions and may determine if a medical encounter described in the electronic patient care report is associated with a Motor Vehicle Accident (MVA). A sub-module may exist independently or as a part of the decisioning engine 280 to determine if a medical encounter is associated with a Motor Vehicle Accident or not. As shown, the one or more input parameters 605 calculated in block 510 of FIG. 5 are provided to the MVA sub-module and upon receiving the one or more input parameters 605, the MVA sub-module extracts MVA rule from a database (e.g., rules database 293) and processes the one or more input parameters 605 based on the MVA rule. The MVA sub-module, based on the MVA rule, checks if "MVA" or "car accident" or "motor vehicle accident" is found in the chief complaint or narrative fields, and (the words "prior" or "previous" are not listed to the left these phrases in the same sentence or "was involved in MVA (numerical value) years/months/days ago" is not found in the narrative). If the rule matches, the MVA sub-module flags the medical encounter data as "Possible MVA—Review Schedule Override."

FIG. 10 provides a block diagram illustrating a process flow for determining whether the predetermined condition flag should be canceled, in accordance with an embodiment of the invention. After checking for predefined conditions (i.e., MVA) as described in FIG. 9, a sub-module existing independently or as a part of the decisioning engine 280 determines if the encounter (e.g., existence of MVA) should be automatically canceled or not. As shown, the one or more input parameters 605 calculated in block 510 of FIG. 5 are provided to the auto-cancel sub-module and upon receiving the one or more input parameters 605, the auto-cancel sub-module extracts auto-cancel rules from a database (e.g., rules database 293 and/or client rules database 295) and processes the one or more input parameters 605 based on the auto-cancel rules. In some embodiments, the auto-cancel sub-module may run solely on the one or more input parameters 605 extracted from the medical encounter data without receiving any input from the other sub-modules. In some embodiments, the auto-cancel sub-module may depend on the information from the LOS sub-module, the MN submodule, and the priority sub-module, but not MVA sub-module. The auto-cancel sub-module may take fields from medical encounter data processed in FIGS. 6A through 9 once they are required by the auto-cancel rule. Most used fields may include Level of Service, LOS Flag, Treatments, Pick-up Facility, Drop-off Facility, Incident Number. The auto-cancel rules are pre-defined in the code and are added to the list in a specific order depending on the client (e.g., client rules). If a rule matches, a Note, Flag, and/or Comment are taken and added to medical encounter data and the medical encounter is marked as cancelled. Once a rule is matched in the list, no other rules are processed after it.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions or executable portions embodied therein.

It will also be understood that one or more computer-executable program code portions or instruction code for carrying out or performing the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing and transforming incoming resources to auto-code reporting parameters, the system comprising:

a memory device with computer-readable program code stored thereon;

a communication device; and a processing device operatively coupled to the memory device and the communication device, wherein the processing device is configured to execute the computer-readable program code to:

receive a plurality of resources comprising data files containing medical service information from a plurality of data sources, wherein the data files from the resources for the same medical services comprise at least one selected from the group consisting of disparate file formats and disparate naming conventions;

pre-process the plurality of resources to extract one or more input parameters, wherein the pre-processing the plurality of resources comprises field mapping the data files and performing one or more data transformations on data present in the one or more data fields to create modified data files without the at least one selected from the group consisting of disparate file formats and disparate naming conventions prior to extracting the one of more input parameters;

process the one or more input parameters, via a decisioning engine;

auto-code one or more reporting parameters based on processing the one or more input parameters from the modified data files, via the decisioning engine, wherein processing the one or more input parameters via the decisioning engine further comprises:

extracting one or more top rules from a rules database associated with each of the one or more reporting parameters, wherein the top rules are determined by a reporting parameter comprising at least one selected from the group consisting of Level of Service (LOS), Medical Necessity (MN), and priority;

extracting one or more post rules from the rules database associated with each of the one or more reporting parameters, wherein the post rules are determined by a reporting parameter comprising at least one selected from the group consisting of Level of Service (LOS), Medical Necessity (MN), and priority, and wherein the post rules comprise checking the medical service information for one or more services or flags and making a decision including adding a flag; and applying the one or more top rules and the one or more post rules to the one or more input parameters to generate one or more decisions associated with each of the one or more reporting parameters, wherein the auto-coding of the one or more reporting parameters is performed based on the one or more decisions, wherein the one or more top rules and the one or more post rules are applied to the one or more input parameters consecutively, and wherein the one or more post rules override the one or more decisions generated using the one or more top rules when the one or more top rules and the one or more post rules are applied consecutively;

check for predetermined conditions based on one or more predetermined rules; and prepare an output file comprising the auto-coded one or more reporting parameters and the predetermined conditions.

2. The system of claim 1, wherein applying the one or more top rules and the one or more post rules to the one or more input parameters comprises performing one or more logical operations on one or more fields associated with each of the one or more top rules and the one or more post rules.

3. The system of claim 2, wherein the processing device is configured to execute the computer-readable program code to:

calculate the one or more fields associated with each of the one or more top rules and the one or more post rules based on mapping one or more fields with one or more data fields present in the one or more resources.

4. The system of claim 1, wherein the processing device is configured to execute the computer-readable program code to:

determine that at least one rule of the one or more top rules or the one or more post rules is matched for each of the one or more reporting parameters;

terminate execution of remaining top rules of the one or more top rules or remaining post rules of the one or more post rules; and generate the one or more decisions based on the at least one rule.

5. A computer program product for processing and transforming incoming resources to auto-code reporting parameters, the computer program product comprising at least one non-transitory computer readable medium having computer-readable program code portions embodied therein, the computer-readable program code portions comprising executable portions for:

receiving a plurality of resources comprising data files containing medical service information from a plurality of data sources, wherein the data files from the resources for the same medical services comprise at least one selected from the group consisting of disparate file formats and disparate naming conventions;

pre-processing the plurality of resources to extract one or more input parameters, wherein the pre-processing the one or more input parameters comprises field mapping the data files and performing one or more data transformations on data present in the one or more data fields to create modified data files without the at least one selected from the group consisting of disparate file formats and disparate naming conventions prior to extracting the one of more input parameters;

processing the one or more input parameters, via a decisioning engine;

auto-coding one or more reporting parameters based on processing the one or more input parameters from the modified data files, via the decisioning engine, wherein processing the one or more input parameters via the decisioning engine further comprises:

extracting one or more top rules from a rules database associated with each of the one or more reporting parameters, wherein the top rules are determined by a reporting parameter comprising at least one selected from the group consisting of Level of Service (LOS), Medical Necessity (MN), and priority;

extracting one or more post rules from the rules database associated with each of the one or more reporting parameters, wherein the post rules are determined by a reporting parameter comprising at least one selected from the group consisting of Level of Service (LOS), Medical Necessity (MN), and priority, and wherein the post rules comprise checking the medical service information for one or more services or flags and making a decision including adding a flag; and applying the one or more top rules and the one or more post rules to the one or more input parameters to generate one or more decisions associated with each of the one or more reporting parameters, wherein the auto-coding of the one or more reporting parameters is performed based on the one or more decisions, wherein the one or more top rules and the one or more post rules are applied to the one or more input parameters consecutively, and wherein the one or more post rules override the one or more decisions generated using the one or more top rules when the one or more top rules and the one or more post rules are applied consecutively;

checking for predetermined conditions based on one or more predetermined rules; and preparing an output file comprising the auto-coded one or more reporting parameters and the predetermined conditions.

6. The computer program product of claim 5, wherein applying the one or more top rules and the one or more post rules to the one or more input parameters comprises performing one or more logical operations on one or more fields associated with each of the one or more top rules and the one or more post rules.

7. The computer program product of claim 6, wherein the computer-readable program code portions comprise executable portions for:

calculating the one or more fields associated with each of the one or more top rules and the one or more post rules based on mapping one or more fields with one or more data fields present in the one or more resources.

8. The computer program product of claim 5, wherein the computer-readable program code portions comprise executable portions for:

determining that at least one rule of the one or more top rules or the one or more post rules is matched for each of the one or more reporting parameters;

terminating execution of remaining top rules of the one or more top rules or remaining post rules of the one or more post rules; and generating the one or more decisions based on the at least one rule.

9. A computer-implemented method for processing and transforming incoming resources to auto-code reporting parameters, the method comprising:

receive a plurality of resources comprising data files containing medical service information from a plurality of data sources, wherein the data files from the resources for the same medical services comprise at least one selected from the group consisting of disparate file formats and disparate naming conventions;

pre-process the plurality of resources to extract one or more input parameters, wherein the pre-processing the plurality of resources comprises field mapping the data files and performing one or more data transformations on data present in the one or more data fields to create modified data files without the at least one selected from the group consisting of disparate file formats and disparate naming conventions prior to extracting the one of more input parameters;

processing the one or more input parameters, via a decisioning engine;

auto-coding one or more reporting parameters based on processing the one or more input parameters from the modified data files, via the decisioning engine, wherein processing the one or more input parameters via the decisioning engine further comprises:

extracting one or more top rules from a rules database associated with each of the one or more reporting parameters, wherein the top rules are determined by a reporting parameter comprising at least one selected from the group consisting of Level of Service (LOS), Medical Necessity (MN), and priority;

extracting one or more post rules from the rules database associated with each of the one or more reporting parameters, wherein the post rules are determined by a reporting parameter comprising at least one selected from the group consisting of Level of Service (LOS), Medical Necessity (MN), and priority, and wherein the post rules comprise checking the medical service information for one or more services or flags and making a decision including adding a flag; and applying the one or more top rules and the one or more post rules to the one or more input parameters to generate one or more decisions associated with each of the one or more reporting parameters, wherein the auto-coding of the one or more reporting parameters is performed based on the one or more decisions, wherein the one or more top rules and the one or more post rules are applied to the one or more input parameters consecutively, and wherein the one or more post rules override the one or more decisions generated using the one or more top rules when the one or more top rules and the one or more post rules are applied consecutively;

checking for predetermined conditions based on one or more predetermined rules; and preparing an output file comprising the auto-coded one or more reporting parameters and the predetermined conditions.

10. The computer-implemented method of claim 9, wherein applying the one or more top rules and the one or more post rules to the one or more input parameters comprises performing one or more logical operations on one or more fields associated with each of the one or more top rules and the one or more post rules.

11. The computer-implemented method of claim 10, wherein the method further comprises:

calculating the one or more fields associated with each of the one or more top rules and the one or more post rules based on mapping one or more fields with one or more data fields present in the one or more resources.

12. The computer-implemented method of claim 9, wherein the method comprises:

determining that at least one rule of the one or more top rules or the one or more post rules is matched for each of the one or more reporting parameters;

terminating execution of remaining top rules of the one or more top rules or remaining post rules of the one or more post rules; and generating the one or more decisions based on the at least one rule.

* * * * *